(12) United States Patent
Tekletsadik

(10) Patent No.: US 9,270,110 B2
(45) Date of Patent: Feb. 23, 2016

(54) FAULT CURRENT LIMITER WITH INTERLEAVED WINDINGS

(71) Applicant: Varian Semiconductor Equipment Associates, Inc., Gloucester, MA (US)

(72) Inventor: Kasegn D. Tekletsadik, Middleton, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 36 days.

(21) Appl. No.: 14/101,990

(22) Filed: Dec. 10, 2013

(65) Prior Publication Data

US 2015/0162742 A1    Jun. 11, 2015

(51) Int. Cl.
*H02H 3/08* (2006.01)
*H02H 9/02* (2006.01)
*H02H 7/04* (2006.01)
*H02H 9/04* (2006.01)

(52) U.S. Cl.
CPC . *H02H 9/02* (2013.01); *H02H 7/04* (2013.01); *H02H 9/021* (2013.01); *H02H 9/04* (2013.01)

(58) Field of Classification Search
USPC .......................................... 361/19, 93.7–93.9
See application file for complete search history.

(56) References Cited

U.S. PATENT DOCUMENTS

| 4,020,438 | A | * | 4/1977 | Manimalethu | ..................... 336/5 |
| 4,336,561 | A | * | 6/1982 | Murphy | ........................ 361/19 |
| 5,225,957 | A | * | 7/1993 | Tsurunaga | ..................... 361/19 |
| 5,892,644 | A | | 4/1999 | Evans et al. | |
| 6,335,851 | B1 | | 1/2002 | Nishidai et al. | |
| 2010/0188786 | A1 | | 7/2010 | Darmann | |
| 2012/0264613 | A1 | | 10/2012 | Tekletsadik | |
| 2014/0100116 | A1 | * | 4/2014 | Schlenga et al. | .............. 505/211 |

FOREIGN PATENT DOCUMENTS

JP    09-233691 A    9/1997

OTHER PUBLICATIONS

International Search Report and Written Opinion Mailed Mar. 16, 2015 for PCT/US2014/066559 Filed Nov. 20, 2014.

* cited by examiner

*Primary Examiner* — Danny Nguyen

(57) ABSTRACT

In one embodiment a fault current limiter comprises a current splitting reactor having interleaved windings to reduce an insertion impedance of the fault current limiter during non-fault conditions. The current splitting reactor having interleaved windings may include a first winding, the first winding including a plurality of sub-windings and a second winding, the second winding including a plurality of sub-windings, the sub-windings of the first winding and the sub-windings of the second winding wounds about the core and interleaved.

20 Claims, 6 Drawing Sheets

FAULT CURRENT LIMITER WITH INTERLEAVED WINDINGS

FIELD

The present embodiments relate to current control devices, and more particularly, to fault current limiting devices and systems.

BACKGROUND

Fault current limiters (FCLs) are used to provide protection against current surges, for example in a power transmission network. Various types of FCLs have been developed over the last several decades, including superconducting fault current limiters (SCFCLs), solid-state fault current limiters, inductive fault current limiters, as well as other varieties that are well known in the art. A power system in which an FCL is implemented may include generation, transmission, and distribution networks that generate and deliver power to various industrial, commercial, and/or residential electrical loads.

A fault current is an abnormal current in an electrical system that may result from a fault in the system, such as a short circuit. A fault current may arise in a system due to any number of events or failures, such as power lines or other system components being damaged by severe weather (e.g. lightning strikes). When such a fault occurs, the fault current limiter acts to protect the system from the fault current. During normal operation, however, it is desired that the fault current limiter will have as little affect on the system being protected as possible.

Thus there is a need for a fault current limiter that has low insertion impedance and causes negligible voltages drop and power loss in the circuit being protected during normal operation but which is still able to protect against fault currents.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In one embodiment, a fault current limiter is provided. The fault current limiter includes a current splitting reactor having interleaved windings, the current splitting reactor comprising a core, a first winding wound about the core, and a second winding wound about the core and interleaved with the first winding to reduce an insertion impedance of the fault current limiter.

In one embodiment, a fault current limiter is provided. The fault current limiter includes a current splitting reactor having interleaved windings, the current splitting reactor comprising a core, a first winding, the first winding including a plurality of sub-windings, and a second winding, the second winding including a plurality of sub-windings, the sub-windings of the first winding and the sub-windings of the second winding wounds about the core and interleaved to reduce an insertion impedance of the fault current limiter.

In one embodiment, a power system is provided. The power system includes a power source, a load electrically connected to the power source, and a fault current limiter electrically coupled to the power source and the load to limit the amount of current in the power system during a fault condition, the fault current limiter comprising a current splitting reactor having interleaved windings, the current splitting reactor comprising a core, a first winding, the first winding including a plurality of sub-windings, and a second winding, the second winding including a plurality of sub-windings, the sub-windings of the first winding and the sub-windings of the second winding wounds about the core and interleaved to reduce an insertion impedance of the fault current limiter during normal operating conditions.

DETAILED DESCRIPTION

Figure 1:
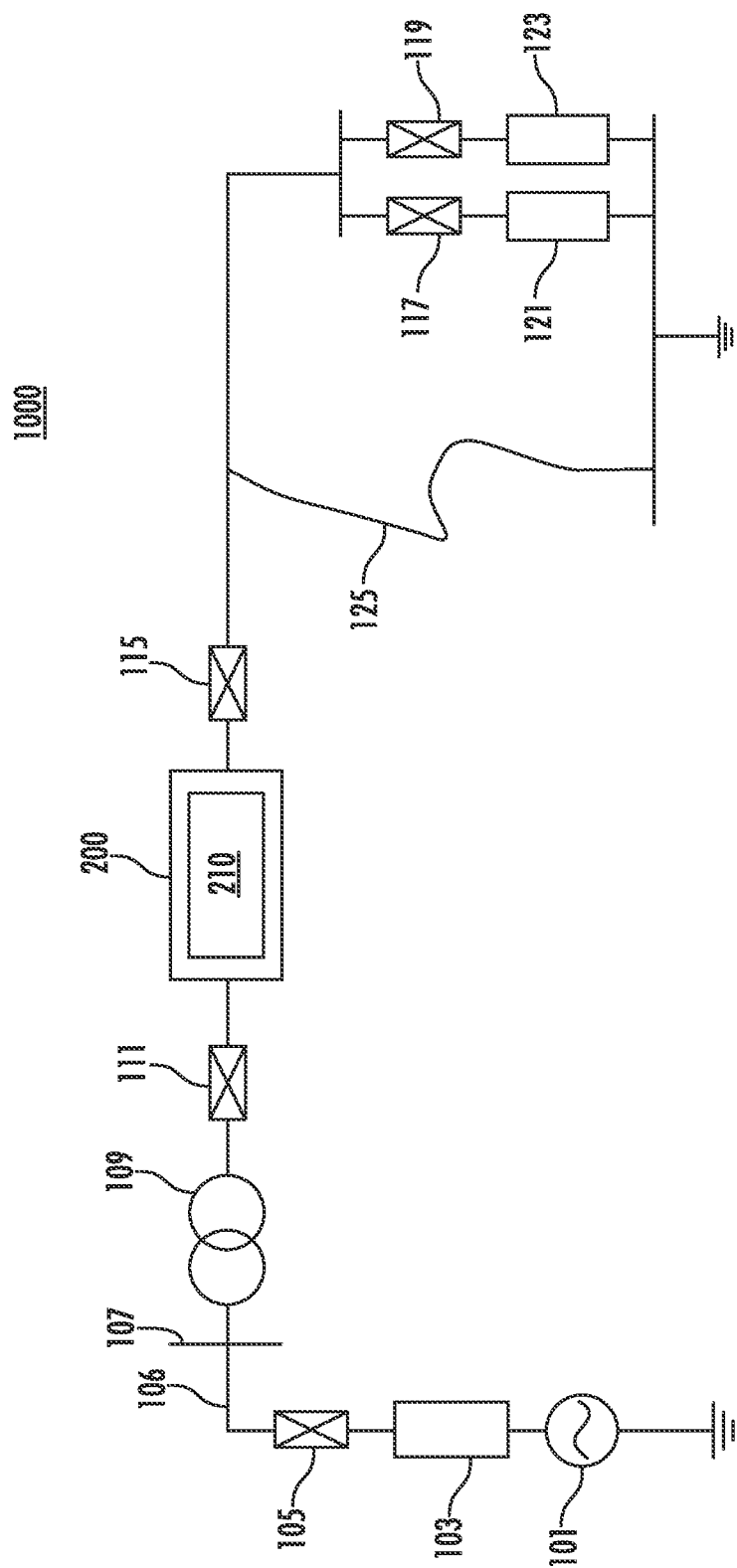
FIG. 1 depicts a one embodiment of an system incorporating an FCL device including a current splitting reactor having interleaved windings.

The present embodiments will now be described more fully hereinafter with reference to the accompanying drawings, in which some embodiments are shown. The subject matter of the present disclosure, however, may be embodied in many different forms and should not be construed as limited to the embodiments set forth herein. Rather, these embodiments are provided so that this disclosure will be thorough and complete, and will fully convey the scope of the subject matter to those skilled in the art. In the drawings, like numbers refer to like elements throughout.

Various embodiments described herein provide FCLs that include a current splitting reactor (CSR) having interleaved windings. Additionally, the current splitting reactor may have an open core design. The FCLs including a CSR having interleaved windings advantageously provides low insertion impedance. As an example, the FCLs described herein may have insertion impedance during normal operating conditions of less than 1% of the total system impedance.

Additionally, the example FCLs described herein may be implemented to limit fault currents in any electrical system, such as, for example, transmission, distribution, and generation systems. Furthermore, with some examples the CSR with interleaved windings may be implemented in a superconducting FCL, a solid state FCL, a fast switch FCL, or in general, any fault current limiting circuit configured to protect a system from fault currents where low insertion impedance is desired during normal operation. In some examples, the FCLs described herein may incorporate saturated iron cores or shielded cores. In a particularly illustrative example, an FCL device with a CSR having interleaved windings as described herein may be provided to lower the insertion impedance of a saturated iron core FCL, which as will be appreciated, typically has high insertion impedance.

Furthermore, various examples provided herein may be implemented in FCL devices for both high and low frequency systems.

FIG. 1 illustrates an FCL circuit 200, implemented in an exemplary system 1000. The FCL 200 includes a current splitting reactor having interleaved windings (IWCSR) 210 (described in greater detail with reference to FIGS. 3-6.) A power source 101 supplies power through interface circuit 103 and circuit breaker 105. Power transmission line 106 leads to an interface 107 with a substation having a transformer 109, which is configured to step the transmission line voltage to a voltage compatible with loads 121, 123. Output of transformer 109 may be coupled to circuit breaker 111 and a FCL 200. FCL 200 may be coupled through circuit breaker 115 and matching circuits 117, 119 to loads 121, 123. Additional loads and matching circuits may be provided. A short circuit fault 125 may exist and, if present, may be isolated by operation of various embodiments described herein.

Figure 2:
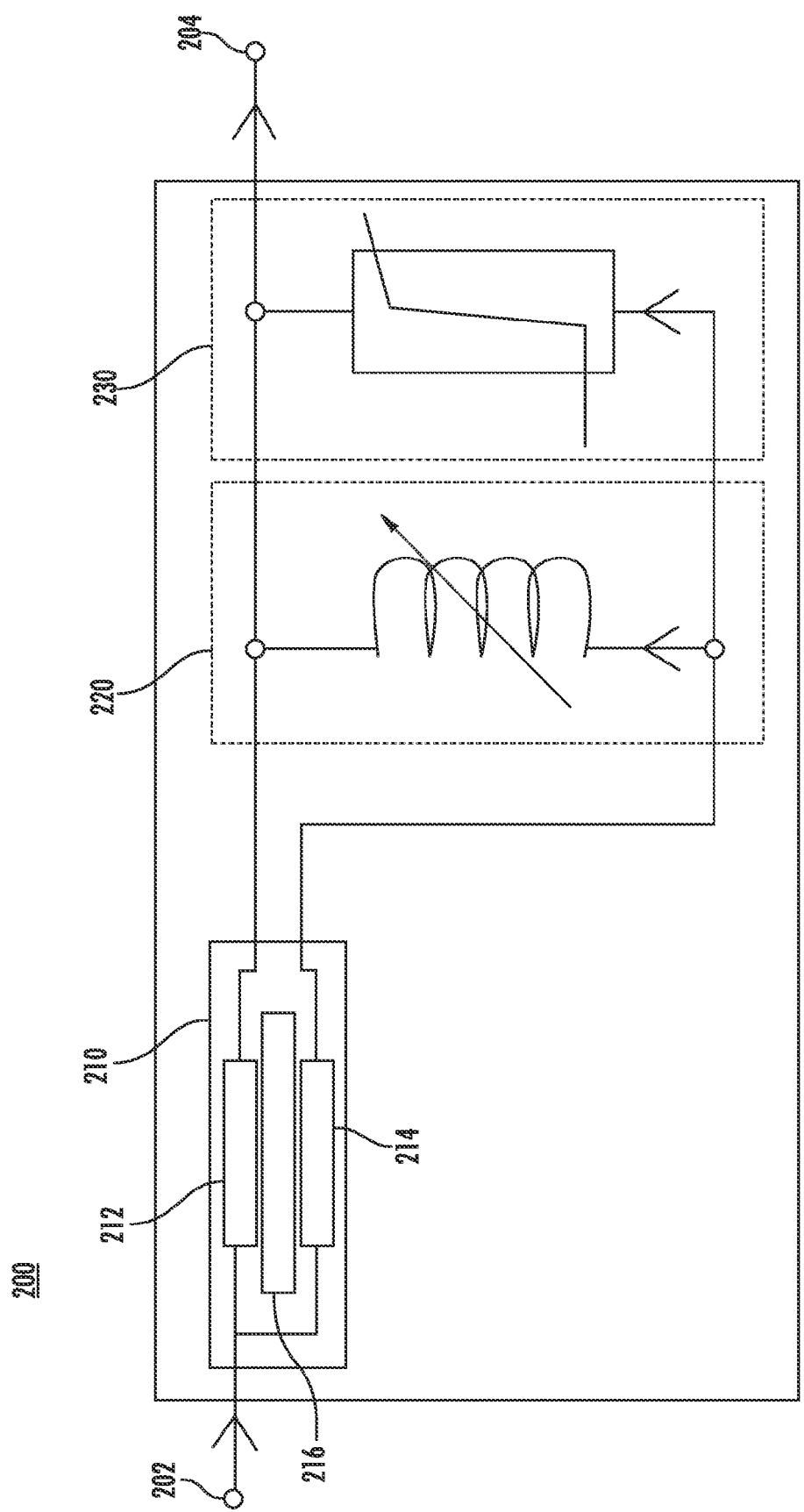
FIG. 2 depicts a one embodiment of an FCL device including a current splitting reactor having interleaved windings.

FIG. 2 illustrates an exemplary FCL 200 arranged according to at least some embodiments of the present disclosure. The FCL 200 includes the IWCSR 210 having a first winding 212 and a second winding 214, which are counter wound and interleaved about a core 216 (described in greater detail with reference to FIGS. 3-6). The FCL 200 includes an input 202 and an output 204 for connecting the FCL 200 to a circuit to be protected (e.g., the loads 121, 123 shown in FIG. 1.) Additionally, the FCL 200 includes a parallel connected voltage controlled reactor (VCR) 220 and fault trigger circuit (FTC) 230. The second winding 214 is connected in series between the input 202 and the parallel connected VCR 220 and FTC 230. Furthermore, various other transient overvoltage control circuits (not shown) may be connected to the VCR 220 for suppressing, shunting, or otherwise protecting the circuits from transient overvoltages caused by fault currents. An FCL including a CSR and its operation may be more fully described in commonly owned U.S. Patent Application Publication No. 2012/0264613, which is incorporated herein by reference in its entirety. It is important to note, that although FIG. 2 illustrates the FCL 200 implemented with the VCR 220, various embodiments of the present disclosure may be implemented without a VCR. For example, a FCL may be implemented according to the present disclosure without a VCR, in which case, the FCL controls its own voltage and in the case of fault, current flows through the high impedance circuitry of the FCL.

During normal operation (e.g., no fault current, such as, the short circuit fault 125, detected), the FTC 230 will be closed and present very little impedance. Accordingly, total current ("$I_T$") will flow into the FCL 200 through the input 202 and pass through the first winding 212 and the second winding 214. As the FTC 230 is closed, the VCR 220 will have negligible current flowing through it. Accordingly, the first winding 212 and the second winding 214 will have portions of the total current $I_T$ proportional to the turns ratio of their winding flowing through them. As the first winding 212 and the second winding 214 are counter wound, their magnetic fields cancel inside the core 216. As a result, the FCL 200 may exhibit very low insertion impedance during normal operation. In some examples, the FCL 200 may insert less than 1% of the system impedance or have less than a 1% voltage drop during normal operation. In some examples, (e.g., where the CSR 210 has a 3:1 current ratio between the first winding 212 and the second winding 214,) the VCR 220 and FTC 230 will merely see 25% of the total current $I_T$. Other ratios can be achieved by changing the winding turns ratio between windings 212 and 214.

During a fault current condition, a fault current higher than the normal current flows into both the first winding 212 and the second winding 214 through the input 202. When the fault current exceeds a predefined trigger current, the FTC 230 opens or inserts very high impedance and fault current transfers to the VCR 220 and any other connected transient overvoltage control circuits (TOCCs). Furthermore, when the FTC opens or becomes high impedance, the impedance of the VCR 220 and any other connected TOCCs becomes high enough to reduce the current flowing through winding 214, which causes the CSR 210 to lose its magnetic field cancellation and introduces a high current limiting reactance. Said differently, during a fault condition, current begins to flow through the VCR 220, which causes the amount of current flowing through the second winding 214 to be reduced. As such, the amount of amper-turns flowing through the first winding 212 and the second winding 214 is no longer equal and the magnetic fields within the core 216 will no longer cancel out, thereby increasing the reactance of the IWCSR 210. This causes the insertion impedance of the FCL 200 to increase, which in turn assists in limiting the fault current.

Accordingly, the FCL 200 provides low insertion impedance during normal operation but high insertion impedance during fault conditions, which operates to limit the fault current. As will be appreciated, when the system voltage increases, the impedance required to limit fault currents also increases. Increasing the current limiting impedance requires the self-reactance of the first winding 212 and the second winding 214 to be increased. The equivalent reactance ("Xeq") of the FCL 200 during normal operation can be described by the following equation, where Xw1 is the self reactance of the first winding 212, Xw2 is the self reactance of the second winding 214, and k is the magnetic coupling between the first winding 212 and the second winding 214. Furthermore, the impedance of the FTC 230 ("$Z_{FTC}$") is zero as the FTC 230 is closed during normal operating conditions.

$$Xeq = \frac{Xw1 * Xw2 - k^2 * Xw1 * Xw2}{Xw1 + Xw2 + 2*k*\sqrt{Xw1 * Xw2}}$$

The equivalent reactance Xeq of the FCL 200 during fault current operation can be described by the following equation, wherein $X_{VCR}$ is the reactance of the VCR 220.

$$Xeq = \frac{Xw1 * (Xw2 + X_{VCR}) - k^2 * Xw1 * Xw2}{Xw1 + Xw2 + X_{VCR} + 2*k*\sqrt{Xw1 * Xw2}}$$

With some embodiments, it is desirable to design the FCL 200 such that the magnetic coupling k is approximately equal to 1. Accordingly, the equivalent reactance Xeq of the FCL 200 during fault current operation can be expressed by the following equation, which assumes that k=1.

$$Xeq = \frac{Xw1 * X_{VCR}}{Xw1 + Xw2 + X_{VCR} + 2*\sqrt{Xw1 * Xw2}}$$

Furthermore, given a turns ratio n=N2/N1, where N2 is the number of turns in the second winding 214 and N1 is the number of turns in the first winding 212 and where Xw2=$n^2$*Xw1, the equivalent reactance of the FCL 200 may be expressed by the following equation.

$$Xeq = \frac{Xw1 * X_{VCR}}{Xw1 * (1 + n)^2 + X_{VCR}}$$

Where $X_{VCR} \gg Xw1*(1+n)^2$, the equivalent reactance Xeq of the FCL 200 is approximately equal to the reactance of the first winding 212. Said differently, Xeq is approximately equal to Xw1.

As will be appreciated from the above equations, realizing low insertion impedance (e.g., below 1% of the system impedance) can be difficult, particularly for large FCL devices. Said differently, as the magnetic coupling of the first winding 212 and the second winding 214 tends to increase with increases in the size of the first winding 212 and the second winding 214, getting the magnetic fields to substantially cancel out during normal operation may be difficult.

Figure 3:
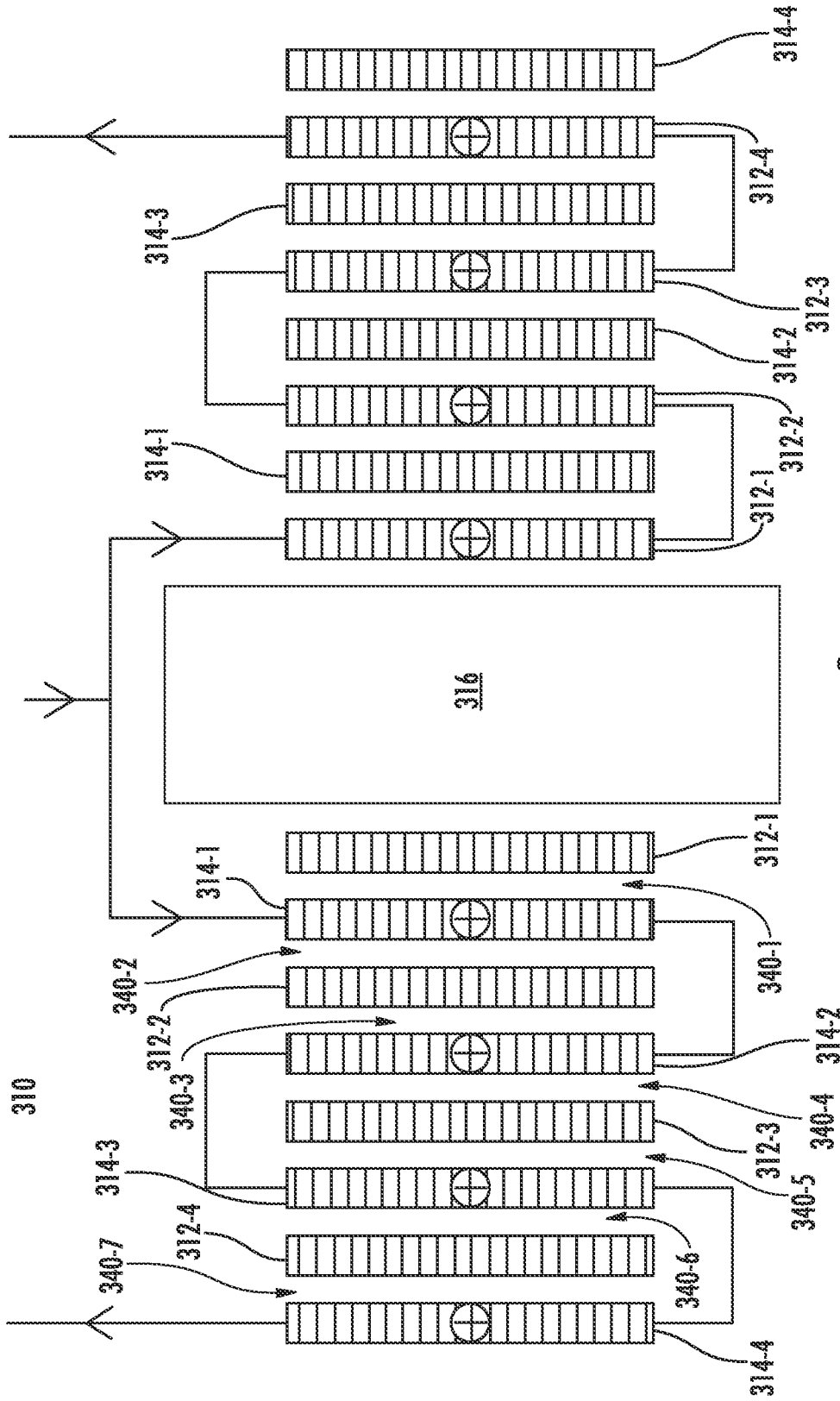
FIG. 3 depicts a one embodiment of a current splitting reactor having interleaved windings.
Figure 4:
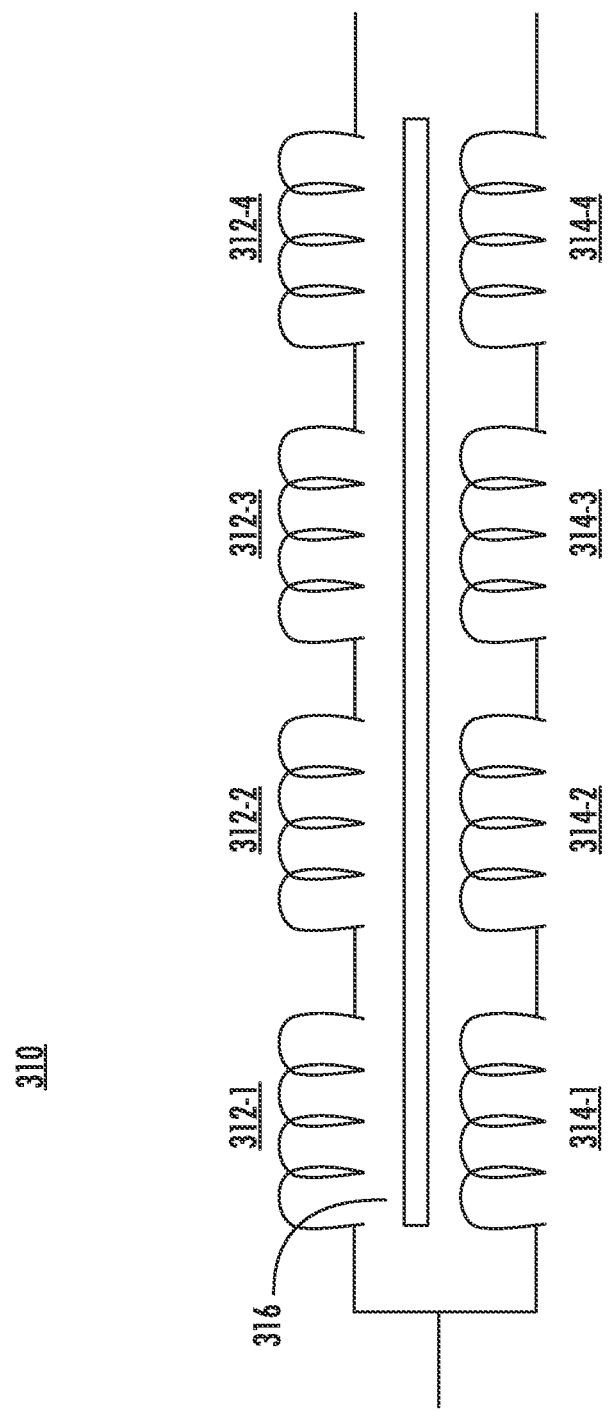
FIG. 4 depicts a schematic diagram of the current splitting reactor having interleaved windings of FIG. 3.
Figure 5:
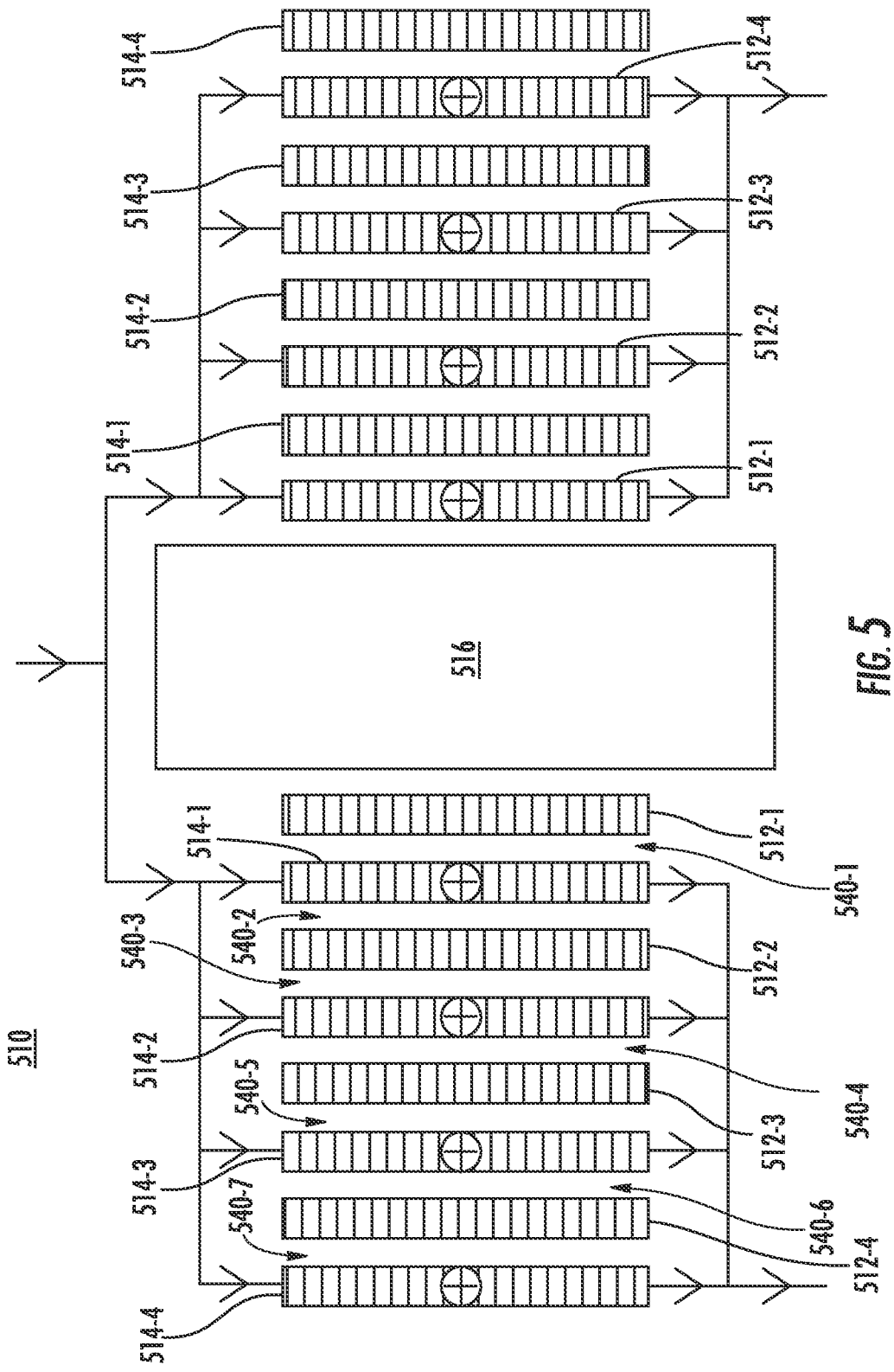
FIG. 5 depicts a one embodiment of a current splitting reactor having interleaved windings.
Figure 6:
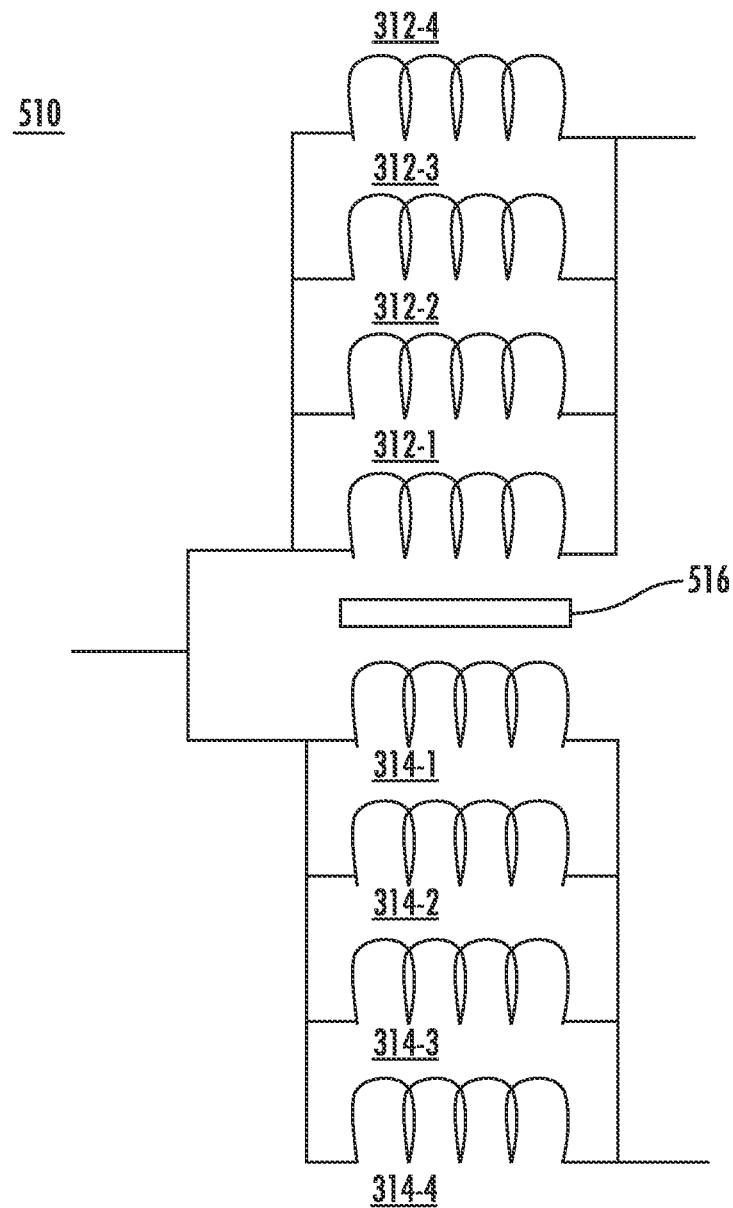
FIG. 6 depicts a schematic diagram of the current splitting reactor having interleaved windings of FIG. 5.

The present disclosure, however, provides the IWCSR 210 where the first winding 212 and the second winding 214 are interleaved to reduce the insertion impedance during normal operation. In general, the IWCSR 210 increases the coupling of the first winding 212 and the second winding 214 by splitting the first winding 212 and the second winding 214 into sub-windings and interleaving the sub-windings about the core 216. FIGS. 3-6 illustrate examples of an IWCSR, which may be implemented as the IWCSR 210. In particular, FIGS. 3-4 illustrate an example IWCSR where the sub-windings are connected in series while FIGS. 5-6 illustrate an example IWCSR where the sub-windings are connected in parallel.

Turning more particularly to FIG. 3, an IWCSR 310 having a first winding 312 and a second winding 314 wound about a core 316 is illustrated. As can be seen, the first winding 312 includes sub-windings 312-1 to 312-4 and the second winding 314 includes sub-windings 314-1 to 314-4. It is noted that FIG. 3 illustrates a cut-away side view of the IWCSR 310. It is to be appreciated that the first winding 312 and the second winding 314 are wound about the core 316. Accordingly, each of the sub-windings (e.g., the sub-windings 312-1 to 312-4 and 314-1 to 314-4) is shown twice, on either side of the core 316, corresponding to the portions that would be visible in a cut-away representation. Furthermore, the sub-windings are counter wounds. More particularly, the sub-windings 312-1 to 312-4 of the first winding 312 are wound in a first direction while the sub-windings 314-1 to 314-4 of the second winding 314 are wound in the opposite direction. This is indicated by the notation of the plus sign within a circle in FIG. 3.

In some examples, the sub-windings 312-1 to 312-4 of the first winding 312 are electrically connected in series and the sub-windings 314-1 to 314-4 of the second winding 314 are electrically connected in series. Additionally, the sub-windings (e.g., 312 and 314) are separated by gaps 340. More specifically, gaps 340-1 to 340-7 separate the sub-windings 312-1 to 312-4 and 314-1 to 314-4. In some examples, the gaps 340-1 to 340-7 may be between 2 mm and 3 cm, and may be provided to facilitate cooling and high voltage insulation.

FIG. 4 illustrates a schematic diagram of the IWCSR 310 shown in FIG. 3. As can be seen from this figure, the sub-windings 312-1 to 312-4 are electrically connected in series to form the first winding 312 and the sub-windings 314-1 to 314-4 are also electrically connected in series to form the second winding 314. Additionally, the core 316 is shown. In some examples, an FCL device may be implemented with the IWCSR 310 to provide increased voltage carrying capacity as a result of the series connected sub-windings.

Turning more particularly to FIG. 5, an IWCSR 510 having a first winding 512 and a second winding 514 wound about a core 516 is illustrated. As can be seen, the first winding 512 includes sub-windings 512-1 to 512-4 and the second winding 514 includes sub-windings 514-1 to 514-4. It is noted that FIG. 5 illustrates a cut-away side view of the IWCSR 510. It is to be appreciated, that the first winding 512 and the second winding 514 are wound about the core 516. Accordingly, each of the sub-windings (e.g., the sub-windings 512-1 to 512-4 and 514-1 to 514-4) is shown twice, on either side of the core 516, corresponding to the portions that would be visible in a cut-away representation. Furthermore, the sub-windings are counter wounds. More particularly, the sub-windings 512-1 to 512-4 of the first winding 512 are wound in a first direction while the sub-windings 514-1 to 514-4 of the second winding 514 are wound in the opposite direction. This is indicated by the notation of the plus sign within a circle in FIG. 5

In some examples, the sub-windings 512-1 to 512-4 of the first winding 512 are electrically connected in parallel and the sub-windings 514-1 to 514-4 of the second winding 514 are electrically connected in parallel. Additionally, the sub-windings (e.g., 512 and 514) are separated by gaps 540. More specifically, gaps 540-1 to 540-7 separate the sub-windings 512-1 to 512-4 and 514-1 to 514-4. In some examples, the gaps 340-1 to 340-7 may be between 2 mm and 3 cm, and may be provided to facilitate cooling and high voltage insulation.

FIG. 6 illustrates a schematic diagram of the IWCSR 510 shown in FIG. 5. As can be seen from this figure, the sub-windings 512-1 to 512-4 are electrically connected in parallel to form the first winding 512 and the sub-windings 514-1 to 514-4 are also electrically connected in parallel to form the second winding 514. Additionally, the core 516 is shown. In some examples, an FCL device may be implemented with the IWCSR 510 to provide increased current carrying capacity as a result of the parallel connected sub-windings.

As described, the sub-windings are separated by a number of gaps (e.g., the gaps 340 in the case of the IWCSR 310 or the gaps 540 in the case of the IWCSR 510). The equivalent reactance of the IWCSR 310 or 510, can be represented based on the number of gaps separating the sub-windings. For example, the following equation may be used to represent the equivalent reactance, where p equals the number of gaps between sub-windings and $X_{FULL}$ equals the full reactance of the first winding and the second winding.

$$Xeq = \frac{X_{FULL}}{p^2}$$

Using the example IWCSR shown in either FIG. 3 or FIG. 5, the equivalent reactance Xeq can be determined as follows: the number of gaps p equals 7, therefor the equivalent reactance Xeq is reduced to $Xeq = X_{Full}/(7^2) = X_{Full}/49 = 0.02 X_{Full}$. Said differently, the insertion impedance of an FCL device incorporating the IWCSR 310 or the IWCSR 510 may be approximately 2% of the full reactance of the FCL device.

It is to be appreciated that the number of sub-windings can be more or less than depicted in the examples presented herein. For example, the first winding and the second winding may include as few as 2 sub-windings each. As another example, the first winding and the second winding may include more than 4 sub-windings. In some examples, the first winding and the second winding may each include between 2 and 7 sub-windings. Furthermore, as described, the turn ratio between the first winding and the second winding may vary. For example, higher current applications require higher turns ratio.

In addition to having first windings and second windings that are interleaved, an IWCSR (e.g., the IWCSR 210, 310, or 510) described above may have either an open core or a closed core. Furthermore, the core may be formed from air, plastic, iron materials. In some examples, an iron core may be used to provide higher current limiting impedance with smaller IWCSR designs. In the case where the core is closed, the core (e.g., the core 216, 316, or 516) may completely enclose the first winding and the second winding. Said differently, the closed core may provide a return path for the magnetic field.

For example, for an iron core, an iron return path would be provided. In the case where the core is open, the core (e.g., the core 216, 316, or 516) may not completely enclose the first winding and the second winding (e.g., refer to FIG. 3 and FIG. 5.) Said differently, the open core may not provide a return path for the magnetic field. In some examples, an open core may be used to provide for a soft saturation and a reduction in the loss of current limiting impedance during a fault condition. Furthermore, in some examples, an open core using iron materials may provide a reactance between 3 and 5 times that of an air core.

Thus, FCLs having low insertion impedance during normal operating conditions but high insertion impedance during fault current conditions are provided. In particular, the FCLs include a CSR having interleaved windings, which provides a significant reduction in the insertion impedance of the FCL device.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are in the tended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Thus, the claims set forth below should be construed in view of the full breadth and spirit of the present disclosure as described herein.

What is claimed is:

1. A fault current limiter, comprising:
   a current splitting reactor having interleaved windings, the current splitting reactor comprising:
   a core;
   a first winding wound about the core; and
   a second winding wound about the core and interleaved with the first winding to reduce an insertion impedance of the fault current limiter.

2. The fault current limiter of claim 1, further comprising a voltage controlled reactor electrically connected to the second winding to change the impedance of the second winding during a fault condition.

3. The fault current limiter of claim 2, further comprising a fault trigger circuit electrically connected in parallel to the voltage controlled reactor, the fault trigger circuit configured to open during a fault condition to cause current flow through the winding connected to the fault trigger circuit to be reduced.

4. The fault current limiter of claim 2, further comprising a fault trigger circuit electrically connected in parallel to the voltage controlled reactor, the fault trigger circuit configured to insert high impedance during a fault condition to cause current flow through the winding connected to the fault trigger circuit to be reduced.

5. The fault current limiter of claim 1, the first winding and the second winding each including a plurality of sub-windings, wherein the sub-windings of the first winding are interleaved with the sub-windings of the second winding.

6. The fault current limiter of claim 4, wherein every other winding about the core corresponds to a sub-winding of the first winding.

7. The fault current limiter of claim 4, wherein the sub-windings of the first winding are electrically connected together in series and the sub-windings of the second winding are electrically connected together in series.

8. The fault current limiter of claim 4, wherein the sub-windings of the first winding are electrically connected together in parallel and the sub-windings of the second winding are electrically connected together in parallel.

9. The fault current limiter of claim 8, wherein the core is open to remove a magnetic return path and to avoid hard saturation of the iron core.

10. A fault current limiter comprising:
    a current splitting reactor having interleaved windings, the current splitting reactor comprising:
    a core;
    a first winding, the first winding including a plurality of sub-windings; and
    a second winding, the second winding including a plurality of sub-windings, the sub-windings of the first winding and the sub-windings of the second winding wounds about the core and interleaved to reduce an insertion impedance of the fault current limiter.

11. The fault current limiter of claim 10, wherein the sub-windings of the first winding are electrically connected together in series and the sub-windings of the second winding are electrically connected together in series.

12. The fault current limiter of claim 10, wherein the sub-windings of the first winding are electrically connected together in parallel and the sub-windings of the second winding are electrically connected together in parallel.

13. The fault current limiter of claim 10, wherein the first winding and the second winding each include between 2 and 7 sub-windings.

14. The fault current limiter of claim 10, wherein the fault current limiter has an insertion impedance during a non-fault condition of less than 1% of system impedance.

15. The fault current limiter of claim 10, wherein the sub-windings of the first winding are separated from the sub-windings of the second winding by a plurality of gaps.

16. The fault current limiter of claim 15, wherein the equivalent reactance of the current splitting reactor having interleaved windings is the ratio of the self reactance of the current splitting reactor having interleaved windings over the square of the number of the plurality of gaps.

17. The fault current limiter of claim 16, wherein the core is open to remove a magnetic return path.

18. The fault current limiter of claim 10, further comprising a voltage controlled reactor electrically connected to the second winding to control the voltage across the fault trigger circuit during a fault condition.

19. The fault current limiter of claim 18, further comprising a fault trigger circuit electrically connected in parallel to the voltage controlled reactor, the fault trigger circuit configured to open during a fault condition to cause current to flow through the voltage controlled reactor.

20. A power system comprising:
    a power source;
    a load electrically connected to the power source; and
    a fault current limiter electrically coupled to the power source and the load to limit the amount of current in the power system during a fault condition, the fault current limiter comprising:
    a current splitting reactor having interleaved windings, the current splitting reactor comprising:
    a core;
    a first winding, the first winding including a plurality of sub-windings; and
    a second winding, the second winding including a plurality of sub-windings, the sub-windings of the first winding and the sub-windings of the second winding wounds about the core and interleaved to reduce an insertion impedance of the fault current limiter during normal operating conditions.

* * * * *